(12) United States Patent
Dandrea

(10) Patent No.: US 9,251,969 B2
(45) Date of Patent: Feb. 2, 2016

(54) PROCESS FOR THE MANUFACTURE OF CARBON SHEET FOR AN ELECTRODE

(75) Inventor: Jay Dandrea, Pittsburgh, PA (US)

(73) Assignee: Axion Power International, Inc., New Castle, PA (US)

( * ) Notice: Subject to any disclaimer, the term of this patent is extended or adjusted under 35 U.S.C. 154(b) by 205 days.

(21) Appl. No.: 14/114,756

(22) PCT Filed: May 3, 2012

(86) PCT No.: PCT/US2012/036209
§ 371 (c)(1),
(2), (4) Date: Jan. 20, 2014

(87) PCT Pub. No.: WO2012/151341
PCT Pub. Date: Nov. 8, 2012

(65) Prior Publication Data
US 2014/0127570 A1    May 8, 2014

Related U.S. Application Data

(60) Provisional application No. 61/481,848, filed on May 3, 2011.

(51) Int. Cl.
*H01G 11/38* (2013.01)
*H01M 4/04* (2006.01)
*H01M 4/20* (2006.01)
*H01M 4/22* (2006.01)
(Continued)

(52) U.S. Cl.
CPC ............ *H01G 11/38* (2013.01); *H01M 4/0435* (2013.01); *H01M 4/20* (2013.01); *H01M 4/22* (2013.01); *H01M 4/364* (2013.01); *H01M 4/621* (2013.01); *H01M 4/628* (2013.01); *H01M 10/06* (2013.01); *Y02E 60/126* (2013.01)

(58) Field of Classification Search
CPC ........ H01G 11/38; H01M 4/364; H01M 4/22; H01M 4/0435; H01M 4/20; H01M 4/621; H01M 4/628; H01M 10/06; B65H 29/00; B65H 29/241; B65H 29/242; B65H 29/243
See application file for complete search history.

(56) References Cited

U.S. PATENT DOCUMENTS

| | | | |
|---|---|---|---|
| 6,127,474 A | 10/2000 | Andelman | |
| 6,446,429 B2 | 9/2002 | Kobayashi et al. | |

(Continued)

FOREIGN PATENT DOCUMENTS

| | | |
|---|---|---|
| CN | 1838999 A | 9/2006 |
| CN | 101194384 A | 6/2008 |
| JP | 2007258611 A | 10/2007 |

OTHER PUBLICATIONS

Abiko et al. [Abiko] (Industrial Health 2010 vol. 48 pp. 427-437).*

(Continued)

*Primary Examiner* — Patrick Ryan
*Assistant Examiner* — Aaron Greso
(74) *Attorney, Agent, or Firm* — Cahn & Samuels, LLP

(57) ABSTRACT

A method of making a single carbon sheet for an electrode includes mixing activated carbon; adding a dispersion comprising a PTFE binder and water to the activated carbon to form a mixture; adding the mixture to a jet mill, and fibrillating the PTFE binder; and feeding the mixture with fibrillated PTFE to a roll mill to form a single carbon sheet in a single pass.

21 Claims, 2 Drawing Sheets

(51) Int. Cl.
*H01M 4/62* (2006.01)
*H01M 4/36* (2006.01)
*H01M 10/06* (2006.01)

(56) References Cited

U.S. PATENT DOCUMENTS

| | | |
|---|---|---|
| 6,589,904 B1 * | 7/2003 | Iwasaki et al. ............. 502/180 |
| 6,628,504 B2 | 9/2003 | Volfkovich et al. |
| 6,706,079 B1 | 3/2004 | Shmatko et al. |
| 7,006,346 B2 | 2/2006 | Volfkovich et al. |
| 7,110,242 B2 | 9/2006 | Adrianov et al. |
| 7,119,047 B1 | 10/2006 | Adrianov et al. |
| 7,147,674 B1 | 12/2006 | Zhong et al. |
| 7,492,571 B2 | 2/2009 | Zhong et al. |
| 7,706,130 B2 * | 4/2010 | Shimoyama et al. .. H01G 9/058 361/502 |
| 7,887,042 B2 | 2/2011 | Sheng et al. |
| 7,998,616 B2 | 8/2011 | Buiel et al. |
| 8,023,251 B2 | 9/2011 | Buiel et al. |
| 8,202,653 B2 | 6/2012 | Buiel et al. |
| 2003/0221996 A1 * | 12/2003 | Svoronos et al. ............. 209/1 |
| 2005/0057888 A1 | 3/2005 | Mitchell et al. |
| 2005/0186473 A1 | 8/2005 | Mitchell et al. |
| 2005/0250011 A1 | 11/2005 | Mitchell et al. |
| 2005/0266298 A1 * | 12/2005 | Mitchell et al. ............. 429/44 |
| 2006/0147712 A1 | 7/2006 | Mitchell et al. |
| 2007/0008677 A1 | 1/2007 | Zhong et al. |
| 2007/0122698 A1 * | 5/2007 | Mitchell et al. ............. 429/217 |
| 2008/0028583 A1 | 2/2008 | Shimoyama et al. |
| 2010/0040950 A1 | 2/2010 | Buiel et al. |
| 2011/0024287 A1 | 2/2011 | Zheng et al. |

OTHER PUBLICATIONS

Minzari et al. [Minzari] (Corrosion Science vol. 50 2008 pp. 1321-1330).*
International Application No. PCT/US2012/0326209, Notification of Transmittal of the International Search Report and the Written Opinion of the International Searching Authority, or the Declaration, dated Oct. 16, 2012.
English Abstract of CN 1838999.
English Abstract of CN 101194384.
English Abstract JP 2007258611.

* cited by examiner

PROCESS FOR THE MANUFACTURE OF CARBON SHEET FOR AN ELECTRODE

This is a U.S. national stage application of PCT international application PCT/US2012/036209 filed on May 3, 2012 and claims priority of U.S. provisional application Ser. No. 61/481,848 filed on May 3, 2011, the entireties of which are incorporated by reference herein.

FIELD OF INVENTION

The present invention is directed to methods of making a single carbon sheet for an electrode in a lead acid battery, supercapacitor, or energy storage device.

BACKGROUND OF INVENTION

Known methods of making an electrode for a battery or energy storage device use carbon as an active material and polytetrafluoroethylene (PTFE) resin as a binder. PTFE resin may fibrillate by applying shear to the resin. These fibrils hold carbon particles together, enabling carbon powder to be formed into a sheet. Fibrillation allows for PTFE to be used in lower loadings on a weight percent, and since it holds the carbon particles together by entanglement instead of coating, the large surface area of the activated carbon remains accessible to an electrolyte.

However, fibrillated PTFE binder particles will, unless lubricated, agglomerate with other fibrillated PTFE particles. If the fibrils agglomerate, the effectiveness of the PTFE as a binder is reduced. Liquid lubricants must be capable of wetting on the surface of the PTFE. Known of PTFE wetting agents include naptha, alcohols, MEK, and fluorosurfactants. Water does not wet PTFE, and therefore in a process that does not utilize organic solvents, lubrication must come from the carbon particles. This requires that the binder be very well dispersed in the carbon matrix prior to the application of shear.

Known methods of making carbon sheet for an electrode have the disadvantage of requiring organic solvents. These solvents, in addition to adding significant costs to the manufacturing process, create health, safety, and environmental issues.

Additionally, the solvents can be difficult to fully remove from the carbon sheet once the sheet has been formed. If solvent remains in the sheet, the sheet will not wet properly in aqueous electrolytes, resulting in poor electrochemical performance.

SUMMARY OF INVENTION

According to a first embodiment of the present invention, a method of making a single carbon sheet for an electrode is characterized by mixing activated carbon; adding a dispersion comprising a PTFE binder and water to the activated carbon to form a mixture; adding the mixture to a jet mill, and fibrillating the PTFE binder; and feeding the mixture with fibrillated PTFE to a roll mill to form a single carbon sheet in a single pass.

According to a second embodiment of the present invention, the method of the first embodiment is further characterized by mixing the activated carbon with a conductive carbon.

It is an advantage of the present invention to form a carbon sheet for an electrode without the need for a solvent.

It is another advantage of the present invention to form a carbon sheet for an electrode in a continuous or semi-continuous manner.

It is yet another advantage of the present invention to form a carbon sheet for an electrode in a single pass or single step through a rolling machine.

It is yet another advantage of the present invention to form a carbon sheet for an electrode having improved energy density.

As used herein "substantially", "generally", "relatively", "approximately", and "about" are relative modifiers intended to indicate permissible variation from the characteristic so modified. It is not intended to be limited to the absolute value or characteristic which it modifies but rather approaching or approximating such a physical or functional characteristic.

References to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

In the following description, reference is made to the accompanying drawings, which are shown by way of illustration to specific embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

DETAILED DESCRIPTION OF THE INVENTION

The present invention is directed to a process for the manufacture of carbon sheet for electrodes in at least one of lead-carbon batteries, capacitors, or energy storage devices. The process according to the present invention produces carbon sheet in a continuous or semi-continuous manner. Further, a carbon/PTFE binder mixture is formed into a sheet in a single step.

Figure 1:
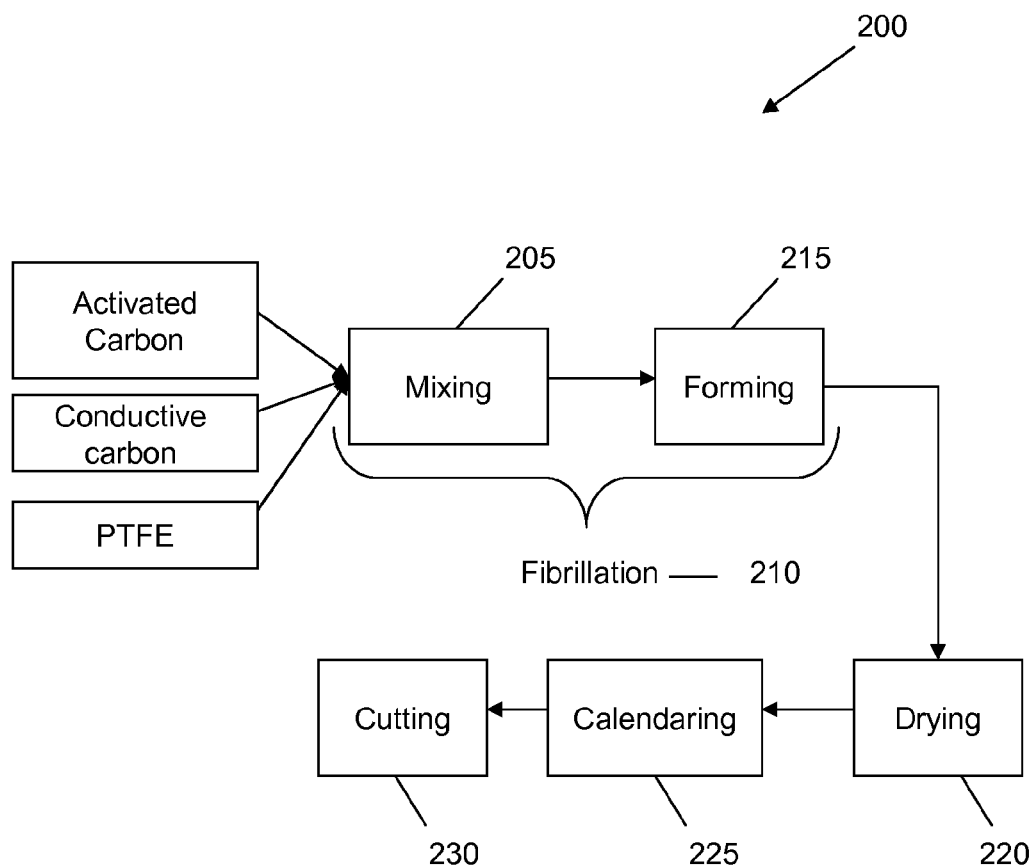
FIG. 1 is a flowchart of a carbon sheeting process according to an embodiment of the invention.

With reference now to the FIG. 1, a flowchart of a process 200 according to an embodiment of the present invention is illustrated.

According to one or more embodiments of the present invention, activated carbon (e.g. powder) and a polytetrafluoroethylene (PTFE) binder are thoroughly mixed together 205. The mixture may comprise conductive carbon, such as graphite or carbon black. The mixture may further comprise a processing aid (e.g., water or surfactant). The mixture may comprise about 60%-99% activated carbon and about 1%-20% PTFE binder by weight. The conductive additive may be present in the amount of 0%-50% by weight, for example about 1-40% by weight. Processing aids may comprise 1%-10% by weight of the mixture. Mixing may be performed by either a continuous or a batch-type mixer.

In specific embodiments, the activated carbon may be in granular form. The granular carbon may be ground by jet mill to a $d_{50}$ particle size of 7 to 9 μm. In specific embodiments, the PTFE binder may be in the form of a PTFE dispersion comprising about 60% solid PTFE and about 40% water by weight. A small amount of surfactant may also present in the PTFE dispersion. In a specific embodiment, the materials are combined in the amounts of 87% activated carbon, 4.3% carbon black, and 8.7% PTFE (solids) by weight.

The mixture is then fibrillated, 210. Fibrillation can occur during at least one of a mixing step 205, a separate fibrillation step, a subsequent forming step, 215, or during any combination of these. According to the present invention, the carbon/PTFE mixture is sent to a jet mill for fibrillation. High shear, generated by high velocity air, fibrillates the PTFE binder.

The fibrillated carbon/PTFE mixture is then formed into a single sheet in one step, 215. According to the present invention the fibrillated carbon/PTFE mixture may formed directly into a sheet in a single pass through a mill, for example, a 2-roll mill. The sheet may have a thickness of 1 to 4 mm, for example, 1.7 mm to 2.4 mm (e.g., 2.1 mm).

The carbon/PTFE sheet is dried, if necessary, 220, to remove any processing aid, and subjected to calendering, 225. If an electrode is to be used in a device utilizing an organic electrolyte, drying is desirable to prevent contamination. In aqueous systems, residual water is of little concern. A surfactant, if present, may be removed by heating the carbon/PTFE sheet above 290° C., if so desired.

According to one or more embodiments, calendering may be required only to increase density and reduce the carbon/PTFE sheet thickness if desirable. If the carbon/PTFE sheet is formed at the desired thickness within acceptable thickness and density tolerances, additional calendering may not be required. The sheet must have good wetting properties in aqueous electrolytes in order for the ion in an electrolyte to have access to a full carbon surface area of the electrode. The carbon/PTFE sheet is then cut to form an electrode, 230.

Figure 2:
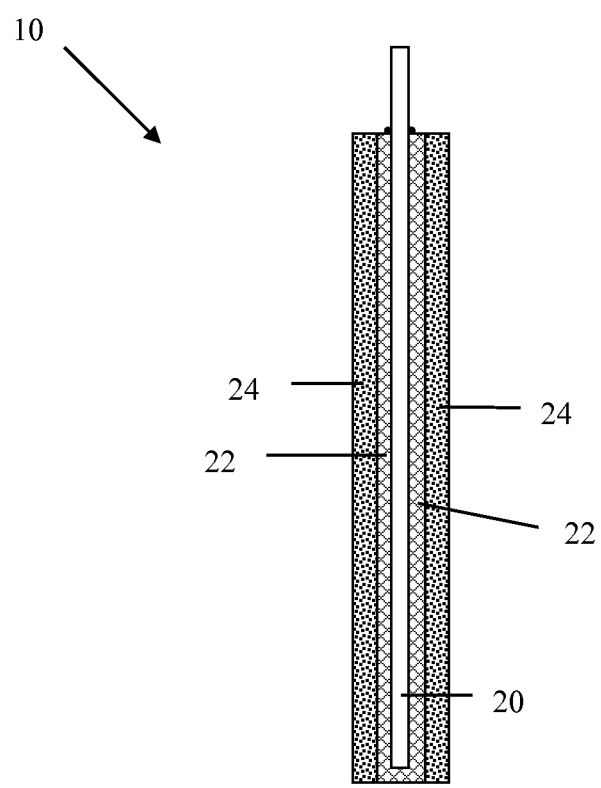
FIG. 2 is a schematic diagram of an electrode according to an embodiment of the invention.

FIG. 2 illustrates an electrode, for example a negative electrode in a battery or energy storage device. The negative electrode 10 comprises a current collector 20. The current collector 20 may be of any effective geometric shape, but is preferably planar and in the form of a sheet, foil, or mesh. At least a substantial portion, if not all, of the surface of at least one face of the current collector 20 is protected against corrosion by having a corrosion-resistant conductive coating 22 (e.g., graphite) secured thereto. The negative electrode also comprises an electrochemically active material 24 (i.e., the activated carbon and fibrillated PTFE sheet according to the present invention) adhered to and in electrical contact with the corrosion-resistant coating 22. A tab portion may extend from a side of the negative electrode, for example, from the current collector 20. In embodiments, the tab portion is an extension of the current collector.

The following are non-limiting, illustrative examples of methods according to the present invention.

Example 1

Activated carbon powder (30 g), was combined with 3 g carbon black in a ball mill and mixed for 1 hour. 4 grams of an aqueous dispersion of PTFE (60% solids) were then added to the carbon and mixing was continued in the ball mill until the binder was evenly dispersed (about 4 hours). The mixture was then transferred to a blender and processed at 22,000 rpm for 10 minutes. The resulting material showed evidence of fibrillation and could be directly rolled into a 0.8 mm sheet through a set of hand rolls.

The above experiment suggested that a fibrillated mixture of carbon and PTFE dispersion could be produced and formed directly into a sheet without the addition of solvents, provided that sufficient shear was applied to the mixture and the components were adequately mixed prior to the application of high shear. In the example, shear was generated by fast moving carbon particles contacting the PTFE particles. The same carbon particles also serve as a lubricant, preventing the fibrillated PTFE from agglomerating.

Example 2

Equipment

Mixing was performed in both a ball mill and a high speed disperser. The ball mill (U.S. Stoneware, Model 755 RMV) used a 1 gallon container and 0.25 inch diameter ceramic balls. The high speed disperser (Ross, Model HSM-100LH2) was equipped with 3.5 inch diameter blade.

Fibrillation of the carbon/PTFE mixture was performed in a Sturtevant Micronizer Jet Mill with a 8 inch grinding chamber. Material was fed into the grinding chamber with a screw feeder (Schenck Accurate). The conditions in the jet mill were similar to the conditions in a blender: both impart momentum on the particles, resulting in high velocity, circular motion. In the blender, the momentum is transferred by the mixing rotor, while the jet mill uses high pressure air passing through a venturi to produce the same effect. In addition to being capable of much higher through put, the jet mill has the advantage of minimal contact with metal parts, reducing the potential for contamination.

The carbon/fibrillated PTFE mixture was formed into a sheet by feeding it to a horizontal 2-roll mill (Stewart Bolling & Co.). The chrome plated rolls were 6 inch in diameter and 13 inch in length. The rolls were heated with a Mokon water temperature control unit capable of producing roll temperatures up to 110° C. (230° F.). Calendering the formed sheet, when applied, was by a custom 2-roll calender mill.

Process

Activated carbon, carbon black, and PTFE dispersion were combined in either the ball mill or the Ross mixer. When the ball mill was used, the activated carbon and carbon black were combined and allowed to mix for 30 minutes. The PTFE dispersion was then slowly added to the container while gently stirring and the container was returned to the mixer. It was then left to mix overnight in order to get adequate mixing. When the Ross mixer was used, activated carbon and carbon black were combined in a 5 gallon mixing pail. The pail was placed such that the rotor was offset from center by roughly half the diameter of the pail, and the cover placed over the pail. The activated carbon/carbon black were then mixed with the rotor turning at 10,000 rpm for 10 minutes.

A funnel was inserted through the cover, and with the rotor speed reduced to 2,000 rpm, the PTFE dispersion was slowly added through the funnel. The rotor speed was increased to 5,000 rpm for 10-20 minutes, the total time depending on the quantity being mixed. Care was taken not to mix too long or too aggressively. Coating of the mixture on the sides of the pail and/or the rotor indicated the binder has begun to fibrillate. The final mixture should have a uniform texture and good flow properties.

The carbon/PTFE mixture was added to a Schenck screw feeder and fed into the jet mill. Prior to each use, the jet mill was run for a minimum of 30 minutes without feeding material in order clean out any residual material from the previous use. After jet milling, the material was collected and transferred to several shallow trays. If a large amount of material was left in a deep container for an extended amount of time, the material at the bottom began to pack together. If this occurred, the material was gently broken back up prior to feed through the roll mill. The fibrillated material was fed through the 2-roll mill to form a single carbon/PTFE sheet in a single pass.

Example 3

Activated carbon powder was added to a screw volumetric feeder and the feeder was set to supply material at a rate of 307 grams per minute. Carbon black was added to a second feeder that was set to a feed rate of 30 grams per minute. The two feeders were positioned to feed their respective materials to a continuous mixer/extruder (Readco Kurimoto 2 inch continuous processor). An aqueous dispersion of PTFE (60% solids) was supplied to the mixer with a pump at a rate of 30 ml per minute. The exit gate on the mixer was positioned over a third screw feeder, which in turn fed the carbon/PTFE mixture to an 8 inch diameter jet-mill, allowing mixing and fibrillation to occur in a continuous manner. The feeders, pump, mixer, and jet-mill were then operated for 20 uninterrupted minutes. The fibrillated mixture was collected in a drum.

The fibrillated mixture was then manually transferred to the nip of a horizontal calender with heated 12 inch diameter rolls. The mixture was fed into the rolls, and exited in the form of a sheet onto a belt conveyor. The sheet was immediately cut into electrodes on the conveyor. The electrodes had a thickness of 2.09 +/−0.01 mm and a density of 0.53 +/−0.01 grams/$cm^3$.

Comparative Example

Carbon sheet for an electrode was made by combining milled activated carbon (84.7 parts by weight) with carbon black (8.5 parts by weight) and an aqueous dispersion of PTFE resin (60% solids, 6.8 parts solids by weight) in a planetary mixer. Water was added while mixing in the amount of 280% of the weight of activated carbon. The resulting mixture was then biaxially calendered into a sheet on a rolling machine. The sheet was then dried in a convection oven to remove the remaining liquid before being calendered to the final thickness and cut to size. The biaxial calendaring method produced a thick, high-density sheet with sufficient strength and electrochemical properties, but required multiple passes through the rolling machine to form the sheet and required that the mixture be collected, folded in half, and rotated 90 degrees with each pass through the rolls.
Discussion
Measurements Quantitative mechanical measurements on the strength of the formed sheet were not possible due to the lack of proper test equipment. Whether or not a formed sheet possessed sufficient strength was determined by 1) its ability to withstand being rolled around a 3 inch radius without cracking and 2) the inventor's extensive experience handling carbon sheet.

Initial electrochemical measurements were made with an edlc test cell in 1.310 Specific Gravity (S.G.) $H_2SO_4$. Capacitance was measured by cyclic voltammetry on a Princeton Applied Research 263A potentiostat. For testing in an asymmetric lead-carbon device (i.e., a PbC® device from Axion International Power, Inc.), electrodes made by Example 2 were assembled into single cell batteries with 7 positive electrodes and 6 negative electrodes. Electrodes manufactured by Example 3 were used to make 6-cell asymmetric lead-carbon batteries.

Mixing

Proper mixing of the materials is necessary to ensure correct feeding into the jet mill chamber and uniform fibrillation. If the material is insufficiently mixed, the PTFE binder agglomerated when fibrillated. Excessive or overly aggressive mixing will begin to fibrillate the binder, which will cause the material to pack together in the feeder. The ball mill worked sufficiently well, but was slow. The Ross mixer was much faster, but care had to be taken not to generate too much shear after the addition of the binder. High shear is useful for rapid distribution of the materials and for breaking up carbon black agglomerates but must be avoided once the binder has been added. Heat generated during mixing will further increase the ease at which the binder will fibrillate. For this reason, the Ross mixer was operated at slower speeds, (3000-5000 rpm, as opposed to 10,000 rpm) after adding the PTFE binder. A planetary type mixer was also used with acceptable results.

Continuous mixing is preferred to batch mixing in high volume applications since the time spent loading and unloading a batch mixer can be significant. Also, since a continuous mixer both mixes and conveys material, the resulting mixture can be transferred to the next step in the process without the need for additional material handling equipment. Changes in material composition can be easily adjusted by changing the feed rates for the raw materials at the mixer inlet. Additionally, a continuous mixer produced a more consistently uniform mixture.
Fibrillation In the present invention, a jet mill is not used for grinding, but to generate high shear forces that will cause the PTFE binder to fibrillate. The amount of shear generated in the jet mill is proportional to the velocity of the air in the chamber, which is controlled by the feed pressure and grind pressure settings on the mill. The feed rate regulates how much material is present in the chamber. Feed pressure was adjusted between 40 psi and 100 psi, for example between 80 psi and 100 psi, and grind pressure was adjusted between 20 psi and 95 psi. About half of the water present in the feed material evaporated during jet milling. A sample that was tested was measured to contain 2.1% water by weight.

Once the PTFE was fibrillated, it must be handled with care, else it will agglomerate into large particles which are difficult to feed through the roll mill and interfere with the feeding of other particles. Transfer of the fibrillated material from collection drum to the roll mill may be done either manually or by vacuum. If the material is conveyed by vacuum, the process may be continuous from raw materials to finished sheet. In either case, the fibrillated material produced from the jet mill must be transferred to the roll mill on a regular basis. If the fibrillated mixture remains in the collection drum for an extended amount of time, it will begin to pack together under its own weight. If this occurs, conveying of the material by vacuum will become difficult. If the material is transferred manually after this occurs, it will not feed into the roll nip properly and the sheet will not form.
Forming In order to have proper feeding through the roll mill and more uniform density of the resulting sheet, it is desirable for the particles of the fibrillated mixture being fed to the roll mill to be of similar size. Very small particles would be ideal for creating uniform density, but are not practical for forming thicker (i.e., greater than 1 mm) sheet, as they will fall directly through the gap between the rolls. Large variations in the size of the particles created feeding problems, resulting in holes in the sheet and cracks, especially at the edges, which can then propagate and break the sheet. Regular transfer of the fibrillated material from the jet mill collection drum to the roll nip prevents the material from agglomerating into larger particles.

The roll surface temperature of the 6 inch diameter 2-roll mill in Example 2 was varied between ambient and 110° C. (230° F.). Below 60° C., it was difficult to form the feed material into a sheet. Above this temperature the sheet could be formed easily. As temperature was increased, the resulting sheet became stronger and more elastic. However, above 90° C., the sheet had a tendency to stick to the rolls after it was formed and thus got damaged as it was peeled off. This is especially common for sheet greater than 1.5 mm. The sticking is believed to be due to poor heat transfer from the roll surface to the interior of the thicker sheet as it is formed. Pre-heating the material before feeding it into the rolls corrects this problem. Both rolls are preferably operated at the same rotational speed, else the sheet will tend to stick to the faster moving roll. Rolls were typically operated between 2-4 rpm (corresponding to linear speeds of 3-6 feet per minute) without detectable differences in sheet quality.

Larger diameter rolls may be preferred as the fibrillated material will spend more time in the roll nip allowing it to build more strength. Better feeding of the material into the nip also occurs due to the larger radius. Carbon sheets as thick as 3.8 mm were demonstrated using the 12 inch diameter horizontal calender and the method described in Example 3.

If the carbon/fibrillated PTFE sheet is formed correctly, it will have sufficient strength to withstand normal handling after the single pass through the 2-roll mill. Sheets as long as 3 meters were demonstrated. The length is limited only by the amount of material fed into the roll mill and the width of the sheet is limited only by the width of the rolls. The density of carbon sheet formed ranged from 0.53 g/cm$^3$ to 0.49 g/cm$^3$ for sheets between 1.8 mm and 2.2 mm. This is without any further additional densification or reduction in thickness by additional calendering. Subsequent calendering of the sheet may increase its strength and improve the thickness tolerance.

A finished electrode made using the carbon sheet of the Comparative Example has a typical density of 0.50 g/cm$^3$ for a sheet of similar thickness. Double layer capacitance of an electrode made according to the Comparative Example measured in an edlc test cell on 1 mm electrodes, was measured to be 72.8 F/cm$^3$ at 1 mV/s. An electrode made from sheet manufactured by Example 2 was measured to have a capacitance of 80.0 F/cm$^3$ by the same method.

Enough carbon sheet was produced according to Example 2 for assembling 24 30H size lead-carbon electrodes (i.e., Axion PbC® electrodes). The sheet was calendared to a final thickness of 2.04 mm. These electrodes were assembled into two single cell lead-carbon batteries. The batteries were charged to 2.3 V and then discharged from 2.3 V to 1 V at constant currents of 12.5 A, 25 A, 50 A, and 100 A. The results are shown in Table 1.

TABLE 1

Test Data for Single Cell Batteries

| Battery | Process | mΩ (1 kHz) | Watt-hours | | | |
|---|---|---|---|---|---|---|
| | | | 12.5 A | 25 A | 50 A | 100 A |
| 1 | Comparative | 1.4 | 37.6 | 33.3 | 27.3 | 18.9 |
| 2 | Example | 1.1 | 38.4 | 34.3 | 28.5 | 19.7 |
| 3 | Example 2 | 1.5 | 45 | 39.3 | 31.1 | 25.4 |
| 4 | | 1.4 | 43.2 | 38.4 | 32.0 | 28.2 |

Carbon electrodes produced according to Example 3 were used to manufacture two six cell 30HT sized asymmetric lead-carbon batteries. The batteries were charged to 2.3 volts per cell then discharged under constant current at 70 amps to 0.6 volts per cell. The results are shown in Table 2.

TABLE 2

Test Data for Six Cell Batteries

| Battery | Process | mΩ (1 kHz) | Amp-hours | Watt-hours |
|---|---|---|---|---|
| 1 | Comparative | 7.0 | 61.9 | 465.5 |
| 2 | Example | 6.8 | 63.4 | 477.6 |
| 3 | Example 3 | 5.6 | 77.7 | 591.1 |
| 4 | | 4.9 | 77.7 | 590.9 |

The test results for the single cell batteries show about a 15% improvement in energy density. For the six cell batteries undergoing a deeper discharge, an increase of about 25% is seen. The increased energy is due to the more uniform fibrillation and distribution of the PTFE binder obtained by the process of the present invention, which leaves more of the carbon surface area available to the electrolyte.

INDUSTRIAL APPLICABILITY

A process for making carbon sheet for electrodes to be used in energy storage devices (e.g., lead acid battery, supercapacitors) is provided. The process does not require a solvent and may form a carbon sheet in a continuous or semi-continuous manner.

Although specific embodiments of the invention have been described herein, it is understood by those skilled in the art that many other modifications and embodiments of the invention will come to mind to which the invention pertains, having benefit of the teaching presented in the foregoing description and associated drawings.

It is therefore understood that the invention is not limited to the specific embodiments disclosed herein, and that many modifications and other embodiments of the invention are intended to be included within the scope of the invention. Moreover, although specific terms are employed herein, they are used only in generic and descriptive sense, and not for the purposes of limiting the description invention.

What is claimed is:

1. A method of making a single carbon sheet for an electrode, comprising:

mixing activated carbon;

adding a dispersion comprising a PTFE binder and water to the activated carbon to form a mixture;

adding the mixture to a jet mill, and fibrillating the PTFE binder; and transferring the mixture with fibrillated PTFE to a roll mill to form a single carbon sheet in a single pass, wherein the single carbon sheet has a thickness of greater than 1 mm.

2. A method according to claim 1, further comprising mixing the activated carbon with a conductive carbon.

3. A method according to claim 2, wherein the conductive carbon comprises at least one of graphite or carbon black.

4. A method according to claim 1, further comprising adding a surfactant to the mixture.

5. A method according to claim 1, wherein the mixture prior to jet milling comprises 60-99 wt. % activated carbon and 1-20 wt. % PTFE.

6. A method according to claim 5, wherein the mixture prior to jet milling further comprises 1-40% conductive carbon.

7. A method according to claim 1, wherein the single carbon sheet has a thickness of 1 to 4 mm.

8. A method according to claim 1, further comprising drying the single carbon sheet.

9. A method according to claim 1, further comprising calendering the single carbon sheet.

10. A method according to claim 1, wherein a feed pressure of the mixture to said jet mill is 40 to 100 psi.

11. A method according claim 1, further comprising evaporating water present in the feed mixture during jet milling to about 2 wt. % water.

12. A method according to claim 1, wherein no organic solvents are utilized.

13. A method according to claim 1, wherein said transferring to a roll mill is by vacuum.

14. A carbon sheet made according to the method of claim 1.

15. An electrode, comprising:
a current collector;
a corrosion-resistant coating on a surface of the current collector; and
a carbon sheet according to claim 14 adhered to the corrosion-resistant coating.

16. An electrode according to claim 15, wherein the carbon sheet has a thickness of greater than 1 mm.

17. An energy storage device, comprising:
at least one electrode according to claim 15; and
an electrolyte.

18. A method according to claim 1, wherein the dispersion comprises about 60% solid PTFE binder and about 40% water by weight.

19. A method according to claim 1, wherein the single carbon sheet has a thickness of 2.1 to 4 mm.

20. A method according to claim 1, wherein the single carbon sheet has a thickness of 2.4 to 4 mm.

21. A method according claim 1, further comprising evaporating about half the water present in the mixture during jet milling.

* * * * *